(12) United States Patent
Blumberg et al.

(10) Patent No.: US 7,461,628 B2
(45) Date of Patent: Dec. 9, 2008

(54) MULTIPLE COMBUSTION MODE ENGINE USING DIRECT ALCOHOL INJECTION

(75) Inventors: Paul Blumberg, Southfield, MI (US);
Leslie Bromberg, Sharon, MA (US);
Daniel R. Cohn, Cambridge, MA (US);
John B. Heywood, Newton, MA (US);
George Davis, Ypsilanti, MI (US);
Michael Zubeck, LaSalle, MI (US);
Robert Stein, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/566,131

(22) Filed: Dec. 1, 2006

(65) Prior Publication Data

US 2008/0127933 A1    Jun. 5, 2008

(51) Int. Cl.
*F02M 43/04* (2006.01)
*F02M 43/00* (2006.01)

(52) U.S. Cl. .......................... 123/304; 123/575

(58) Field of Classification Search ................ 123/304, 123/575, 577, 578, 295, 305, 299, 21
See application file for complete search history.

(56) References Cited

U.S. PATENT DOCUMENTS

| | | | |
|---|---|---|---|
| 2,221,405 A | 11/1940 | Nallinger | |
| 3,589,348 A | 6/1971 | Reichhelm | |
| 3,794,000 A | 2/1974 | Hodgkinson | |
| 4,031,864 A | 6/1977 | Crothers | |
| 4,136,652 A | 1/1979 | Lee | |
| 4,205,650 A | 6/1980 | Szwarcbier | |
| 4,256,075 A | 3/1981 | Fukui et al. | |
| 4,311,118 A | 1/1982 | Slagle | |
| 4,325,329 A | 4/1982 | Taylor | |
| 4,331,121 A | 5/1982 | Stokes | |
| 4,342,287 A * | 8/1982 | Concepcion | 123/1 A |
| 4,402,296 A | 9/1983 | Schwarz | |
| 4,411,243 A | 10/1983 | Hardenberg et al. | |
| 4,480,616 A | 11/1984 | Takeda | |
| 4,489,596 A | 12/1984 | Linder et al. | |
| 4,502,453 A | 3/1985 | Kabasin et al. | |
| 4,590,904 A | 5/1986 | Wannenwetsch | |

(Continued)

FOREIGN PATENT DOCUMENTS

EP       1057988       1/2006

(Continued)

OTHER PUBLICATIONS

U.S. Appl. No. 60/780,319, filed Mar. 8, 2006, Bromberg et al.

(Continued)

*Primary Examiner*—Mahmoud Gimie
(74) *Attorney, Agent, or Firm*—Alleman Hall McCoy Russell & Tuttle, LLP

(57) ABSTRACT

A method of operating an engine, comprising of performing homogeneous charge compression ignition combustion during a first operating condition, and performing spark ignition combustion during a second operating condition, where an amount of directly injected alcohol in at least one of said homogeneous charge compression ignition combustion and said spark ignition combustion is varied in response to at least an operating parameter.

20 Claims, 11 Drawing Sheets

U.S. PATENT DOCUMENTS

| | | | |
|---|---|---|---|
| 4,648,367 A | 3/1987 | Gillbrand et al. | |
| 4,706,630 A | 11/1987 | Wineland et al. | |
| 4,810,929 A | 3/1989 | Strumbos | |
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A | 2/1991 | Ozasa et al. | |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,056,490 A | 10/1991 | Kashima | |
| 5,056,494 A | 10/1991 | Kayanuma | |
| 5,111,795 A | 5/1992 | Thompson | |
| 5,131,228 A | 7/1992 | Mochizuki et al. | |
| 5,188,087 A | 2/1993 | Saito | |
| 5,204,630 A | 4/1993 | Seitz et al. | |
| 5,230,309 A | 7/1993 | Suga et al. | |
| 5,233,944 A | 8/1993 | Mochizuki | |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,565,157 A | 10/1996 | Sugimoto et al. | |
| 5,694,908 A | 12/1997 | Hsu | |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,921,222 A | 7/1999 | Freeland | |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,318,083 B1 | 11/2001 | Machida et al. | |
| 6,382,225 B1 | 5/2002 | Tipton | |
| 6,494,192 B1 | 12/2002 | Capshaw | |
| 6,505,579 B1 | 1/2003 | Lee | |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,690 B2 | 9/2003 | Ando et al. | |
| 6,651,432 B1 | 11/2003 | Gray, Jr. | |
| 6,651,677 B2 * | 11/2003 | Sukegawa et al. | 123/305 |
| 6,659,068 B2 * | 12/2003 | Urushihara et al. | 123/295 |
| 6,691,669 B2 | 2/2004 | Surnilla et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,845,616 B2 | 1/2005 | Jauss | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 | 12/2005 | Mori | |
| 6,988,485 B2 | 1/2006 | Ichise et al. | |
| 6,990,956 B2 | 1/2006 | Niimi | |
| 7,055,500 B2 | 6/2006 | Miyashita et al. | |
| 7,082,898 B2 * | 8/2006 | Kitamura et al. | 123/21 |
| 7,121,926 B2 | 8/2006 | Sadakane et al. | |
| 7,121,254 B2 * | 10/2006 | Wickman et al. | 123/304 |
| 7,159,568 B1 | 1/2007 | Lewis et al. | |
| 7,178,503 B1 | 2/2007 | Brehob | |
| 7,225,787 B2 | 6/2007 | Bromberg et al. | |
| 7,255,080 B1 | 8/2007 | Leone | |
| 7,261,064 B2 | 8/2007 | Bhaisora et al. | |
| 7,278,396 B2 | 10/2007 | Leone et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 2001/0035215 A1 | 11/2001 | Tipton et al. | |
| 2002/0038645 A1 * | 4/2002 | Chmela et al. | 123/276 |
| 2002/0121263 A1 * | 9/2002 | Chmela et al. | 123/295 |
| 2003/0089337 A1 | 5/2003 | Cohn et al. | |
| 2003/0127072 A1 | 7/2003 | Gmelin et al. | |
| 2003/0221660 A1 | 12/2003 | Surnilla et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0250790 A1 * | 12/2004 | Heywood et al. | 123/300 |
| 2004/0261763 A1 | 12/2004 | Hashimoto et al. | |
| 2005/0051135 A1 | 3/2005 | Tomoda et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane et al. | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0102158 A1 * | 5/2006 | Cairns et al. | 123/568.14 |
| 2006/0150952 A1 * | 7/2006 | Yang et al. | 123/432 |
| 2006/0174853 A1 * | 8/2006 | Koopmans | 123/295 |
| 2006/0191727 A1 | 8/2006 | Usami et al. | |
| 2006/1800099 | 8/2006 | Aimoto et al. | |
| 2007/0028600 A1 * | 2/2007 | Ogawa et al. | 60/285 |
| 2007/0028861 A1 * | 2/2007 | Kamio et al. | 123/25 A |
| 2007/0028905 A1 | 2/2007 | Shinagawa | |
| 2007/0034192 A1 | 2/2007 | Kamio et al. | |
| 2007/0062484 A1 * | 3/2007 | Yang | 123/295 |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0204830 A1 * | 9/2007 | Andri | 123/198 F |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |

| | | | |
|---|---|---|---|
| 2007/0215127 | A1 | 9/2007 | Dearth et al. |
| 2007/0215130 | A1 | 9/2007 | Shelby et al. |
| 2007/0219679 | A1 | 9/2007 | Leone |
| 2007/0219701 | A1* | 9/2007 | Hashimoto et al. .......... 701/103 |
| 2007/0221163 | A1 | 9/2007 | Kamio |
| 2007/0234976 | A1 | 10/2007 | Dearth et al. |
| 2007/0289573 | A1 | 12/2007 | Leone et al. |
| 2007/0295307 | A1 | 12/2007 | Kerns |

FOREIGN PATENT DOCUMENTS

| | | |
|---|---|---|
| JP | 61065066 | 4/1986 |
| JP | 2007/0756754 | 3/2007 |
| WO | WO 2004/097198 | 11/2004 |
| WO | WO 2006/055540 | 5/2006 |
| WO | WO 2007/106354 | 9/2007 |
| WO | WO 2007/106416 | 9/2007 |

OTHER PUBLICATIONS

U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.
U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/962,683, filed Dec. 21, 2007, Pursifull et al.
U.S. Appl. No. 11/776,120, filed Jul. 11, 2007, Stein et al.
D.R. Crohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Techonology.
L. Bromberg et al., "Calculations of Knock Suppressions in Highly Turbocharged Gasoline/Ethanol Engines Using Direct Ethanol Injection", Jul. 7, 2005, Massachusetts Institute of Technology.
Stephen Russ, "A Review of the Effect of Engine Operating Conditions on Borderline Knock", SAE Technical Paper Series 960497, Feb. 26-29, 1996.
S. Brusca et al., "Water Injection in IC—SI Engines to Control Detonation and to Reduce Pollutant Emissions", SAE Technical Paper No. 2003-01-1912, May 19-22, 200.
Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.
Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

* cited by examiner

MULTIPLE COMBUSTION MODE ENGINE USING DIRECT ALCOHOL INJECTION

BACKGROUND AND SUMMARY

Internal combustion engines may operate in a variety of combustion modes. One example mode is homogeneous charge compression ignition (HCCI), wherein a homogeneous or near homogeneous air and fuel mixture achieves a temperature and/or pressure where combustion occurs by auto-ignition without requiring a spark being performed by a sparking device. Auto-ignition timing may be varied by adjusting one or more of the initial charge temperature, amount of residual or recirculated exhaust gas, actual and/or effective compression ratio, etc. While HCCI may have greater fuel efficiency and reduced NOx production compared to other combustion modes under selected conditions, it may also be limited since a substantial amount of heat and pressure may be needed to produce combustion. Further, transitions into and out of the HCCI mode may present various control issues. In general, HCCI combustion may be enhanced over a wider operating range by increasing the compression ratio of the cylinders. However, HCCI operation and similar modes of operation, such as PCCI (Premixed Charge compression ignition, where there is stratification of the air/fuel mixture) may be limited to low loads (torque).

Another example mode that may be used is spark ignition (SI) combustion. SI combustion may be used during high load and/or transient operating conditions to increase torque output and maintain sufficient control of combustion timing. Further, adjustments in spark ignition timing may be used to mitigate undesirable engine operating conditions, such as sustained engine knock. However, while spark retard may mitigate engine knock, this can reduce engine fuel efficiency. As such, engines may need to operate at lower actual or effective compression ratios during SI combustion to avoid knock.

Thus, a general incompatibility may exist between the higher compression ratio preferred for HCCI operation and the lower compression ratio for SI operation, limiting the benefits that can be achieved. While some adjustment to compression ratio may be available via variable valve timing, variable valve lift, variable compression ratio, etc., the degree of adjustment necessary may require significant amounts of additional engine hardware and increased cost. Further, even if such hardware is present, the ability to rapidly and effectively control both knock and compression ignition may be limited by the time characteristics of the mechanical device transitions, etc.

As such, the inventors herein have recognized that the above issues may be addressed in one example by a method of operating an engine, comprising performing homogeneous charge compression ignition combustion during a first operating condition; and performing spark ignition combustion during a second operating condition, where an amount of alcohol in at least one of said homogeneous charge compression ignition combustion and said spark ignition combustion is varied in response to at least an operating parameter of the engine. Directly injected alcohol may be a particularly advantageous way to control operation because of the large amount of knock suppression that results from evaporative cooling of the fuel/air charge. This can be used to enable operation at substantially higher compression ratio in spark ignition engines.

In this way, for example, it may be possible to utilize higher compression ratio engine operation without knock limitations when the engine operates under SI combustion mode, thereby enabling an expanded HCCI design range (i.e., increased compression ratio) and improved spark ignition fuel economy. Likewise, the inventors herein have also recognized that it is also possible to utilize adjustments in a relative amount of alcohol or a variable timing of alcohol delivery to control the timing of HCCI combustion, thereby further enabling improved operation and transient performance.

Note that there are various adjustments to an amount of alcohol that may be used, such as adjusting a ratio of an amount of alcohol to an amount of another fuel (e.g., gasoline), adjusting an absolute amount of alcohol, adjusting an alcohol concentration, and/or combinations thereof.

DETAILED DESCRIPTION

Gasoline engines, particularly those with a boosting device, may employ a variable direct injection of a knock suppressing fuel such as an alcohol or alcohol blend to provide improved performance. As one prophetic example, an engine including a turbocharger and a high compression ratio along with selective and variable ethanol direct injection in addition to gasoline injection may achieve a 20%-30% increase in efficiency over a naturally aspirated spark ignition engine of larger size delivering the same torque and power. The directly injected ethanol provides a large knock suppression effect from the evaporative cooling of the fuel/air charge within the cylinder of the engine. This improvement in efficiency can enable the engine to be substantially downsized and/or operate at a higher compression ratio while providing a similar level of performance. These efficiency gains may be even further increased by use of a controlled auto-ignition e.g. a homogeneous charge compression ignition (HCCI) mode of operation at some operating conditions to enable improved fuel economy and reduced emissions. The synergy of HCCI and selective use of a knock suppressing fuel mixture facilitates both increased efficiency and reliable HCCI combustion, since the knock suppressing fuel mixture can serve as yet another control for HCCI combustion timing in addition to the benefits gained by operating at an increased compression ratio. As another prophetic example, ultra lean or heavy EGR operation could increase the overall efficiency gain to the 30-40% range due to this synergy.

Figure 1:
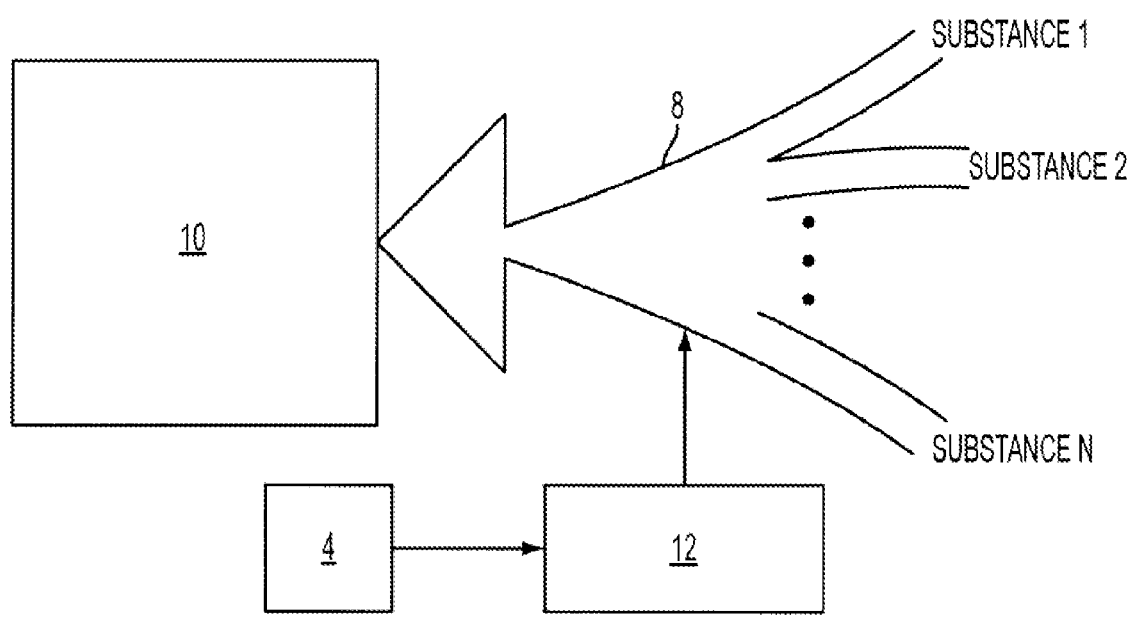
FIG. 1 illustrates a schematic diagram of an engine system.

FIG. 1 shows an engine 10 receiving delivery of a plurality of substances (1, 2, . . . , N) via arrow 8. The various substances may include multiple different fuels, fuel blends, injection locations, or various other alternatives.

For example, multiple different substances having different gasoline and/or alcohol and/or water, and/or other compound concentrations may be delivered to the engine, and may be delivered in a mixed state, or separately delivered. Further, the relative amounts and/or ratios of the different fuel mixture substances may be variably controlled by a controller 12 in response to operating conditions (i.e. operating parameters), which may be provided via sensor(s) 4, which may include engine sensors, transmission sensors, vehicle sensors, ambient condition sensors, etc.

In one example, different substances may represent different fuels having different levels of alcohol and/or octane, such as one substance including gasoline and another other including ethanol. In another example, engine 10 may use gasoline as a first substance and an alcohol containing fuel such as ethanol, methanol, a mixture of gasoline and ethanol (e.g., E85 which is approximately nominally 85% ethanol and 15% gasoline, but in practice closer to 80% ethanol and 20% gasoline by volume), a mixture of gasoline and methanol (e.g., M85 which is approximately 85% methanol and 15% gasoline), a mixture of an alcohol and water, a mixture of an alcohol, water, and gasoline, etc. as a second substance. In still another example, the first substance may be a gasoline/alcohol blend with a lower alcohol concentration than a gasoline/alcohol blend of a second substance. In yet another example, the first substance may be gasoline or diesel fuel, and the second substance may be a dimethyl ether, a methyl ester, a lower alkyl alcohol (such as methanol, ethanol, propanol, or butanol), or a mixture thereof. As noted herein, Alcohols and/or alcohol fuel blends have properties that make them suitable for operation in HCCI and SI mode. Not only is the intrinsic octane rating of alcohols substantially higher than gasoline, but they also have higher heat of vaporization. When used in direct injection, the resulting cooling of the air/fuel mixture may be effective to prevent or mitigate the presence of knock.

In some embodiments, different injector locations may be used for different fuels. For example, a single injector (such as a direct injector) may be used to inject a mixture of two substances (e.g., gasoline and an alcohol/water mixture), where the relative amount or ratio of the two or more fuel quantities or substances in the mixture may be varied during engine operation via adjustments made by controller 12 via a mixing valve (not shown), for example. In still another example, two different injectors for each cylinder may be used, such as a port and a direct injector, two port injectors, or two direct injectors, each injecting a different substance in different relative amounts as operating conditions vary. In some embodiments, different sized injectors, in addition to different locations and different substances, may be used. In yet another embodiment, two port injectors with different spray patterns and/or aim points may be used. In yet another embodiment, a single direct injector with concentric spray nozzles fed by two different fuel lines may inject two separate fuels.

Various advantageous results may be obtained by one or more of the above described systems. For example, when using both gasoline and a fuel including alcohol (e.g., ethanol), it may be possible to adjust the relative amounts of the fuels to take advantage of the increased charge cooling of alcohol fuels (e.g., via direct injection) to reduce the tendency of knock (e.g., increasing a relative amount of alcohol and/or water in response to knock or increased load). This phenomenon, combined with increased compression ratio, and/or boosting (including increasing manifold pressure) and/or engine downsizing, can then be used to obtain increased fuel economy benefits (by reducing the knock limitations on the engine), while allowing the engine to operate on gasoline at lighter loads when knock is not as great a constraint.

In one approach, overall lean, including ultra lean combustion with gasoline HCCI operation can be employed up to a level of torque approaching a condition where engine controllability reaches a threshold. At conditions of higher torque/load, spark ignition mode of operation may be employed to provide the desired level of engine control and output. For example, the engine can be operated at a compression ratio that is sufficiently high (e.g. greater than 13:1) to facilitate compression ignition and increase engine efficiency, while reducing the potential for knock during spark ignition combustion by the selective use of the knock suppressing fuel or fuel mixture. For example, at higher levels of torque or speed, spark ignition operation may be used with varying mixtures of gasoline and directly injected ethanol. Thus, in some cases, a separate source of knock suppressing fuel or fuel mixture may be used, for example, to provide an amount of ethanol to the engine that is independent of the amount of gasoline. In one example, the HCCI operation may include running lean/heavy EGR at low loads, whereas SI stoichiometric operation may be used at high loads Further, even at relatively low torque during HCCI and/or SI operation, some level of knock suppressing fuel or fuel mixture such as directly injected ethanol may be used to prevent or reduce knock that may otherwise occur from operation at the high compression ratio (or to control the combustion timing of the HCCI/PCCI operation. The alcohol could be injected in the cylinder so that it is uniformly distributed in the cylinder, by early ethanol injection, or it can be injected as to result in partial stratification (both fuel and temperature stratification), for example by late injection. It is also possible to attain and maintain stratification of the air/fuel mixture through motion in the cylinder. As the level of torque is increased, thereby increasing the potential for knock, the relative amount of ethanol may be increased to reduce knock from occurring or reduce the intensity of the knock. Ethanol or other knock suppressing fuel mixtures may be provided to the engine from a second tank or could be mixed with the gasoline such as in the case of E85 or other mixtures with gasoline. In one example, a first primary (and possibly volumetrically larger) fuel tank holds a first fuel mixture and a second (smaller) tank holds a second fuel mixture, where the second fuel mixture has a higher alcohol content, for example (e.g., the first tank may hold gasoline while the second tank holds E85). Further still, the consumption of the knock suppressing fuel or fuel mixture may be reduced over a drive cycle of the engine by using an amount sufficient to reduce or prevent knock at a given operating condition. The knock suppressing fuel or fuel mixture consumption may also be reduced by setting the controller 12 such that the engine operates over as wide range of conditions in the HCCI mode of operation, thus providing increased drive cycle efficiency and lowering usage of the knock suppressing fuel or fuel mixture.

Figure 2:
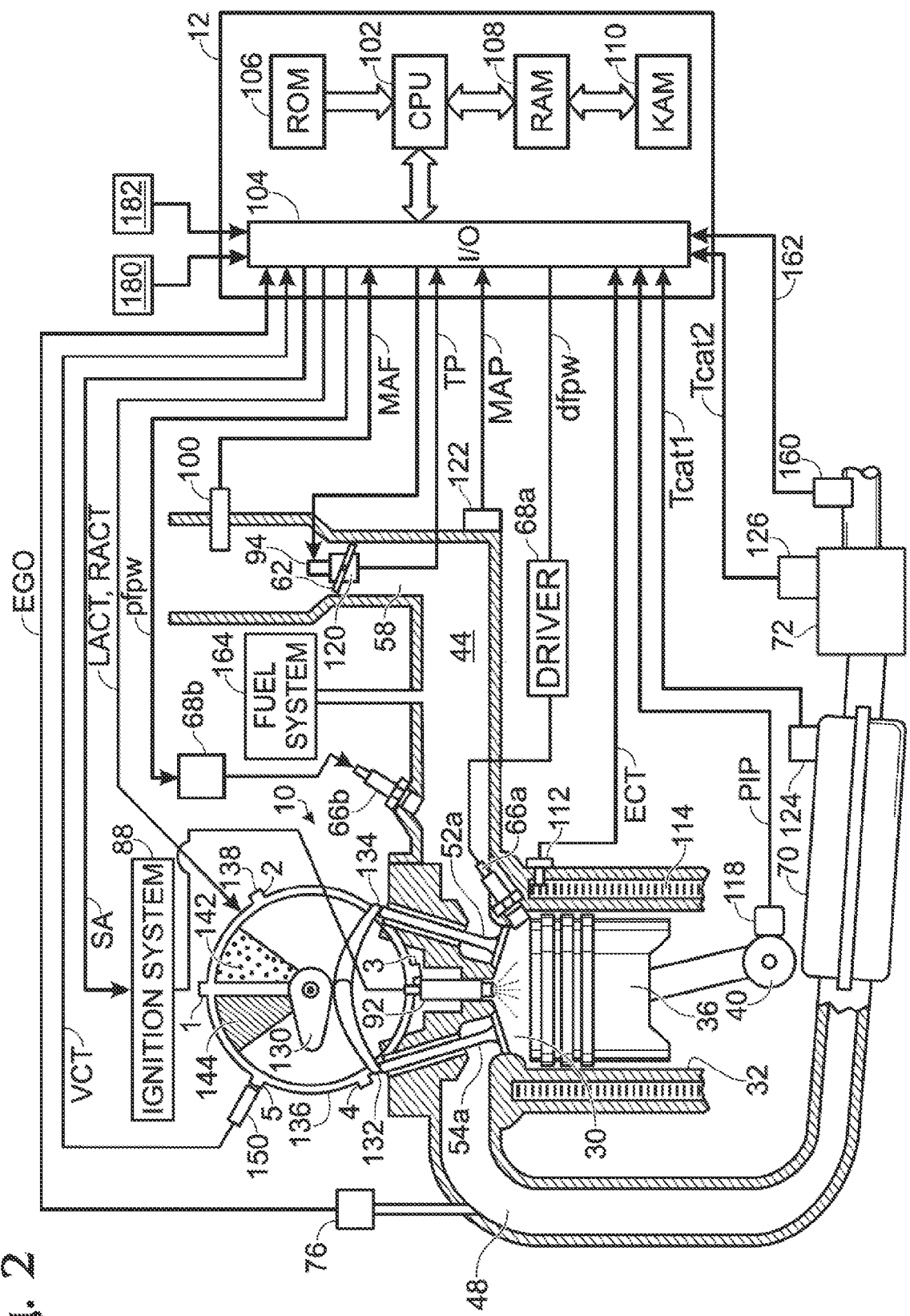
FIG. 2 illustrates a partial view of an exemplary embodiment of an engine.

Referring now to FIG. 2, one cylinder of a multi-cylinder engine is illustrated, as well as the intake and exhaust path connected to that cylinder. Engine 10 as illustrated and described herein may be included in a vehicle such as a road automobile, among other types of vehicles. In some examples, engine 10 may be included as a portion of a hybrid propulsion system including one or more other motors or engines, such as in the case of a hybrid electric vehicle (HEV). While the example applications of engine 10 will be described with reference to vehicles, it should be appreciated that engine 10 may be used in other applications not necessarily confined to vehicle propulsion systems.

In the particular embodiment shown in FIG. 2, the engine includes a fuel system with two fuel injectors per cylinder, for at least one cylinder of the engine. In some embodiments, each cylinder of the engine may include two fuel injectors. The two injectors may be configured in various locations, such as two port injectors, one port injector and one direct injector (as shown in FIG. 2), two direct injectors, a single, two-fuel direct injector, or in other configurations.

Also, as described herein, there are various configurations of the cylinders, fuel injectors, and exhaust system, as well as various configurations for the fuel vapor purging system and exhaust gas oxygen sensor locations.

Continuing with FIG. 2, a multiple injection system is illustrated, where engine 10 includes both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40.

In one particular example, piston 36 may include a recess or bowl (not shown) to help in forming stratified charges of air and fuel, if desired. However, in an alternative embodiment, a flat faced piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another embodiment, a single intake and single exhaust valve per cylinder may also be used. In still other embodiments, two intake valves and one exhaust valve per cylinder may be used. Still further, three or more intake valves and/or three or more exhaust valves per cylinder may be used.

Combustion chamber 30 can have a compression ratio, which is the ratio of volumes between when piston 36 is at bottom center to when piston 36 is at top center. In one example, the compression ratio may be within a range of approximately 13:1-15:1. However, other compression ratios may be used including compression ratios greater than 15:1 or less than 13:1. For example, at compression ratios greater than 15:1, a greater amount of knock suppressing fuel or fuel mixture may be used to reduce knock, while at compression ratios less than 13:1, a lesser amount of knock suppressing fuel or fuel mixture may be used to reduce knock.

Fuel injector 66a is shown directly coupled to combustion chamber 30 for delivering injected fuel directly therein in proportion to the pulse width of signal dfpw received from controller 12 via electronic driver 68a. While FIG. 2 shows injector 66a as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66a by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66b is shown coupled to intake manifold 44, rather than directly to cylinder 30. Fuel injector 66b delivers injected fuel in proportion to the pulse width of signal pfpw received from controller 12 via electronic driver 68b. Note that a single driver may be used for both fuel injection systems, or multiple drivers may be used. Fuel system 164 is also shown in schematic form delivering vapors to intake manifold 44, where fuel system 164 is also coupled to injectors 66a and 66a (although not shown in this FIGURE). Various fuel systems and fuel vapor purge systems may be used.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may include any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66a during a compression stroke. In another example, a homogenous mixture may be formed by operating one or both of injectors 66a and 66b during an intake stroke (which may be open valve injection). In yet another example, a homogenous mixture may be formed by operating one or both of injectors 66a and 66b before an intake stroke (which may be closed valve injection). In still other examples, multiple injections from one or both of injectors 66a and 66b may be used during one or more strokes (e.g., intake, compression, exhaust, etc.). Even further examples may be where different injection timings and mixture formations are used under different conditions, as described below. It would also be possible to operate one injector such that the fuel from this injector is homogeneously distributed through the cylinder (such as per early injection of this fuel, or appropriate fuel spray pattern), while the second fuel, from another injector is inhomogeneously distributed through the cylinder (as per late injection of the second fuel fuel). Further, it is possible, through multiple injections of a single fuel, to have a portion of either first or second fuels be homogeneously distributed, while the balance of the fuel be inhomogeneously distributed.

Controller 12 can control the amount of fuel delivered by fuel injectors 66a and 66b so that the homogeneous, stratified, or combined homogenous/stratified air/fuel mixture in chamber 30 can be selected to be at stoichiometry, a value rich of stoichiometry, or a value lean of stoichiometry.

While FIG. 2 shows two injectors for the cylinder, one being a direct injector and the other being a port injector, in an alternative embodiment two port injectors for the cylinder may be used, along with open valve injection, for example.

Emission control device 72 is shown positioned downstream of catalytic converter 70. Emission control device 72 may be a three-way catalyst or a NOx trap, or combinations thereof.

In one example, NOx control in such an engine can be provided by lean and/or heavy EGR operation at low loads, when the engine operates in HCCI mode, coupled with a three way catalyst with stoichiometric operation during SI mode of operation at high loads.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may include roller finger followers, direct acting mechanical buckets or other alternatives to rocker arms. Further still, the valvetrain may be of a non-conventional type including non-mechanical elements such as electromechanical or electrohydraulic valve mechanisms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Alternatively, in some embodiments, one or more of the intake and/or exhaust valves may be controlled by electric valve actuation (EVA), or hydraulic valve actuation (HVA). As one example, the exhaust valves may be controlled by a variable camshaft timing system while the intake valves may be controlled by EVA. The valve timing and/or valve lift may be controlled by the control system by varying the current applied to the electromechanical valve actuators.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch at the steering column, for example. The starter is disengaged after engine starting, for example, by engine 10 reaching a predetermined speed after a predetermined time.

Continuing with FIG. 2, an exhaust gas recirculation system is shown. Exhaust gas may be delivered to intake manifold 44 by an EGR tube communicating with exhaust manifold 48 through an EGR valve assembly (not shown). Alternatively, the EGR tube could be an internally routed passage in the engine that communicates between exhaust manifold 48 and intake manifold 44.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66a, 66b, or combinations thereof depending on various factors, to control engine air-fuel ratio.

Figure 3:
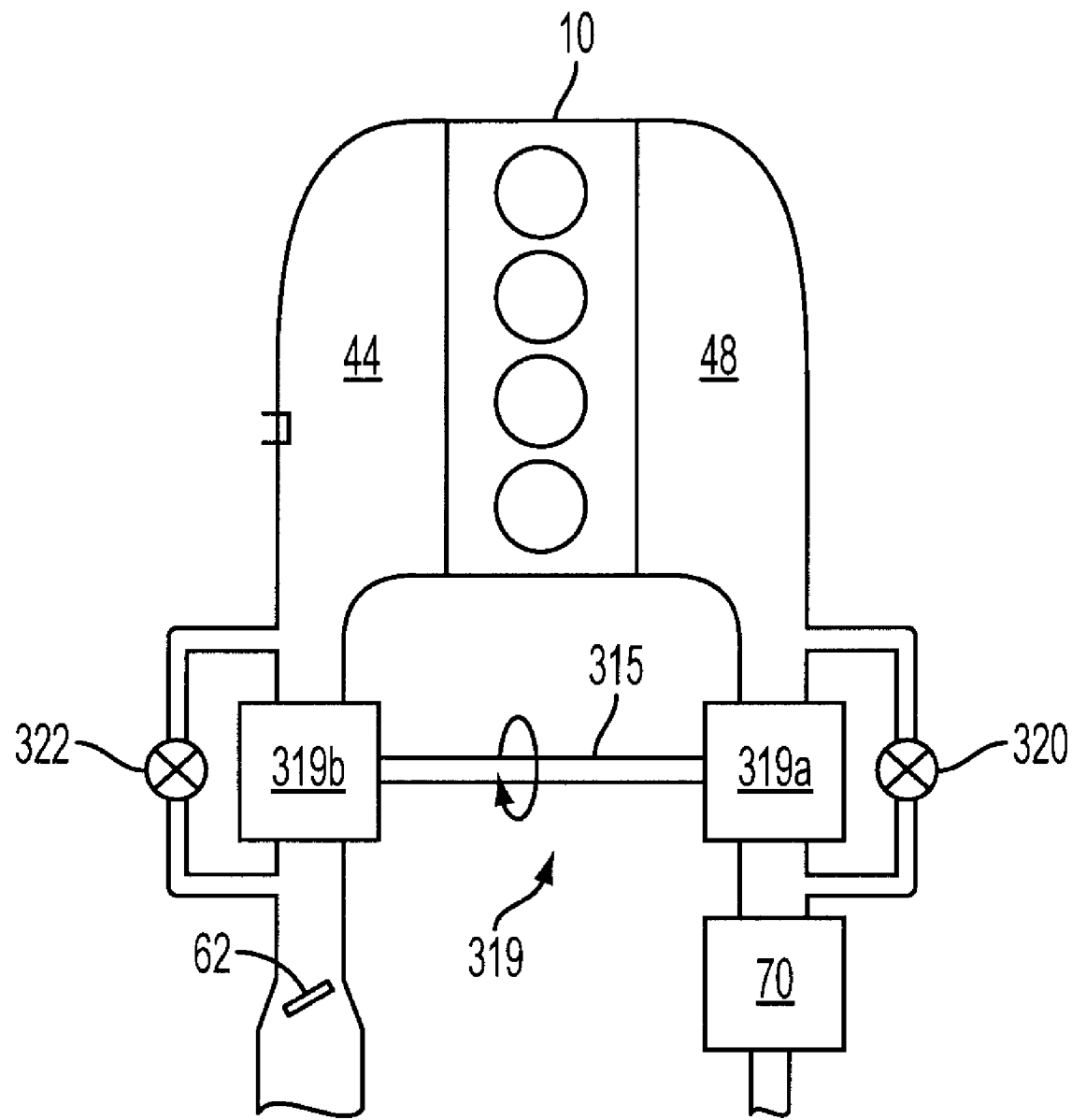
FIG. 3 illustrates an engine such as shown in FIG. 2 including a turbocharger.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders. As shown in FIG. 3, engine 10 may be coupled to various boosting devices, such as a supercharger or turbocharger. On a boosted engine, desired torque may also be maintained by adjusting wastegate and/or compressor bypass valves.

Referring now specifically to FIG. 3, an example engine 10 is shown including four in-line cylinders. In one embodiment, engine 10 may include a turbocharger 319, which has a turbine 319a coupled to the exhaust manifold 48 and a compressor 319b coupled to the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controller via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a mechanically or electrically driven supercharger may be used, if desired.

Figure 4:
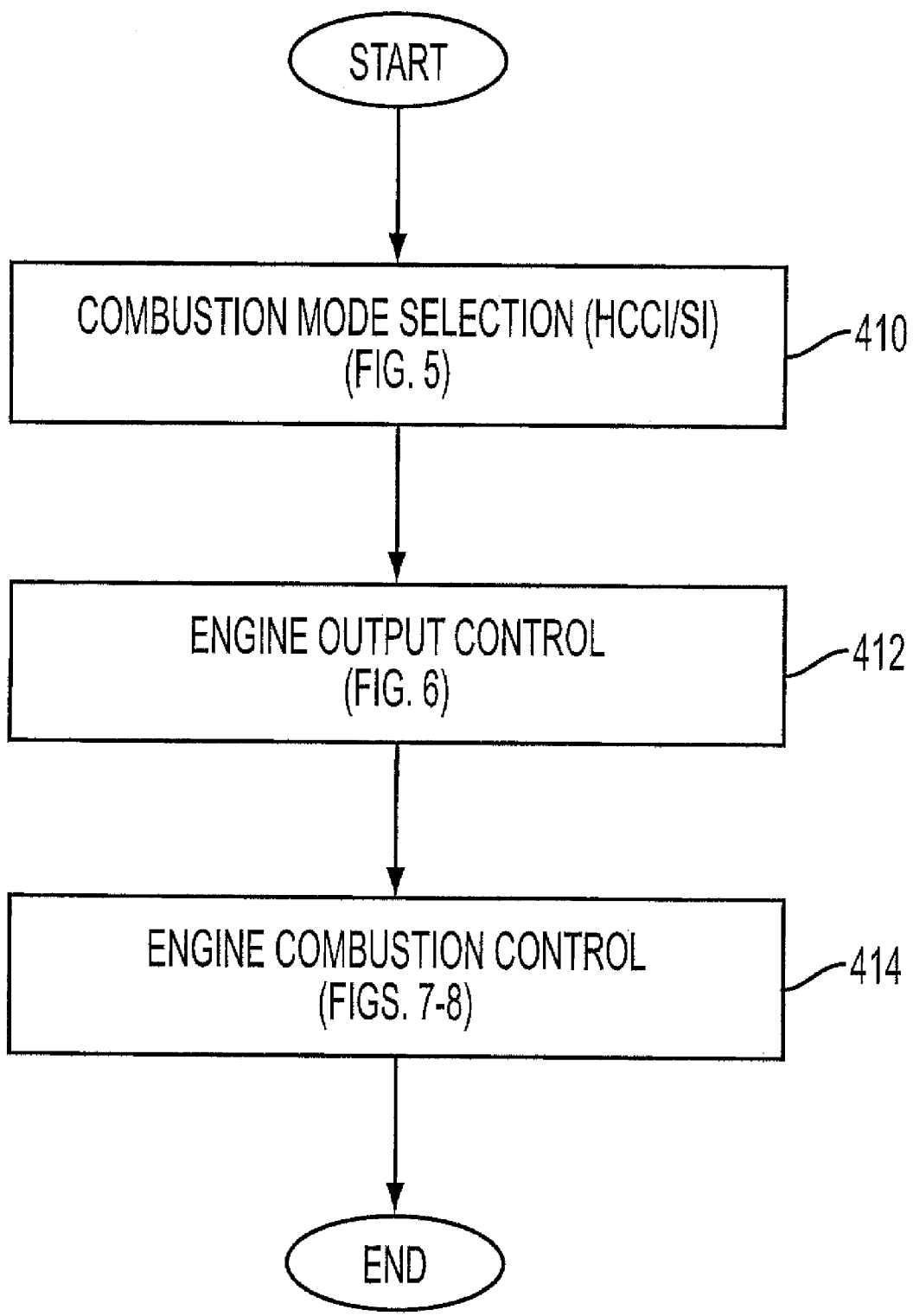
FIGS. 4-9 illustrate flowcharts depicting example control routines.

Referring now to FIG. 4, a high level flow chart of overall engine operation is described. At 410 a combustion mode may be selected, for example, between HCCI and SI modes based on operating conditions including the level of one or more fuels or fluids (e.g. level of E85, ethanol, methanol, water, gasoline, etc.) and/or the requested torque or speed of the engine, among other conditions. Control relating to selection of the combustion mode will be described in greater detail with reference to FIG. 5.

At 412, engine output may be controlled based on the mode selected at 410. For example, the level of torque produced by the engine may be controlled differently depending on the selected combustion mode. As one example, the torque produced by the engine or a cylinder thereof may be varied during SI mode by varying the amount of air supplied to the engine or the cylinder. During HCCI mode, torque may be controlled by varying the amount of fuel supplied to the engine, among other operating conditions. Thus, engine conditions such as torque may be more responsive to airflow during SI mode and fuel injection during HCCI mode. Further, the level of turbocharging or supercharging provided to the engine may be controlled differently depending on whether the engine is operating in SI mode or HCCI mode. For example, more or less turbocharging may be performed during HCCI mode than during SI mode. Control relating to engine output will be described in greater detail with reference to FIG. 6.

At 414, engine combustion control may be achieved by one or more of spark timing control, fuel injection timing, air/fuel ratio control, knock suppression control (e.g. alcohol/E85 ratio and/or amounts), knock feedback, cylinder pressure feedback, variable valve timing control, fuel vapor purging control, and engine starting conditions. Engine combustion control will be described in greater detail with reference to FIGS. 7 and 8. In this way, the control system may operate the engine by coordinating combustion mode selection, engine output, and engine combustion timing with respect to operating conditions. Further, it may be possible to adjust (e.g., increase) manifold pressure when (and in response to) using such knock suppression techniques, in addition to providing improved HCCI combustion timing control.

Figure 5:
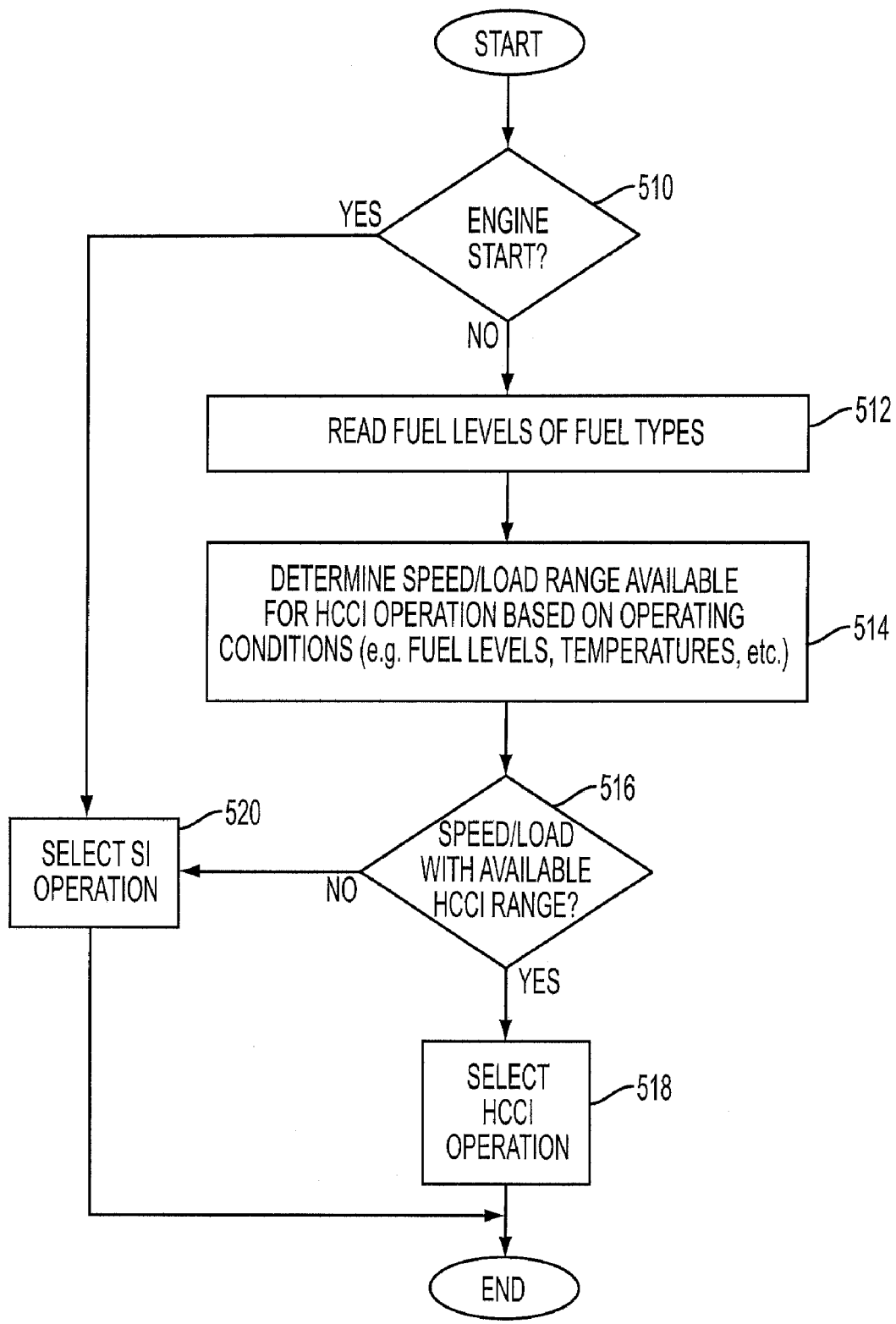

As indicated above, FIG. 5 illustrates a flow chart describing an example method for selecting a combustion mode for the engine. At 510, it may be judged whether the engine is at start-up (e.g. to be started or is operating in a start-up or warm-up state) or whether a particular cylinder is to begin a firing sequence from a deactivated state in the case of a VDE (Variable Displacement Engine) or cylinder cut-out. If the answer at 510 is yes, then SI mode may be selected at 520. Alternatively, if the answer at 510 is no, the fuel levels of the various fuel types may be read at 512. Different fuel types may refer to different injection locations, different alcohol fuel blends, different octane ratings, etc. For example, a separate level for E85, gasoline, and/or ethanol may be identified by the control system via fuel or fluid level sensors. Next, the speed/load range available for HCCI mode operation may be identified based on operating conditions including the fuel levels determined at 512, engine temperature, fuel temperature, air temperature, etc.

At 516, it may be judged whether the requested engine speed/load is within the available HCCI range identified at 514. If the answer is no, SI mode may be selected at 520. Alternatively, if the requested engine speed/load is within the available HCCI range, then HCCI operation may be selected at 518. Finally, the routine may end or return. In this way, the control system may select the combustion mode suitable for the operating conditions of the engine including fuel conditions and requested engine speed and torque.

Figure 6:
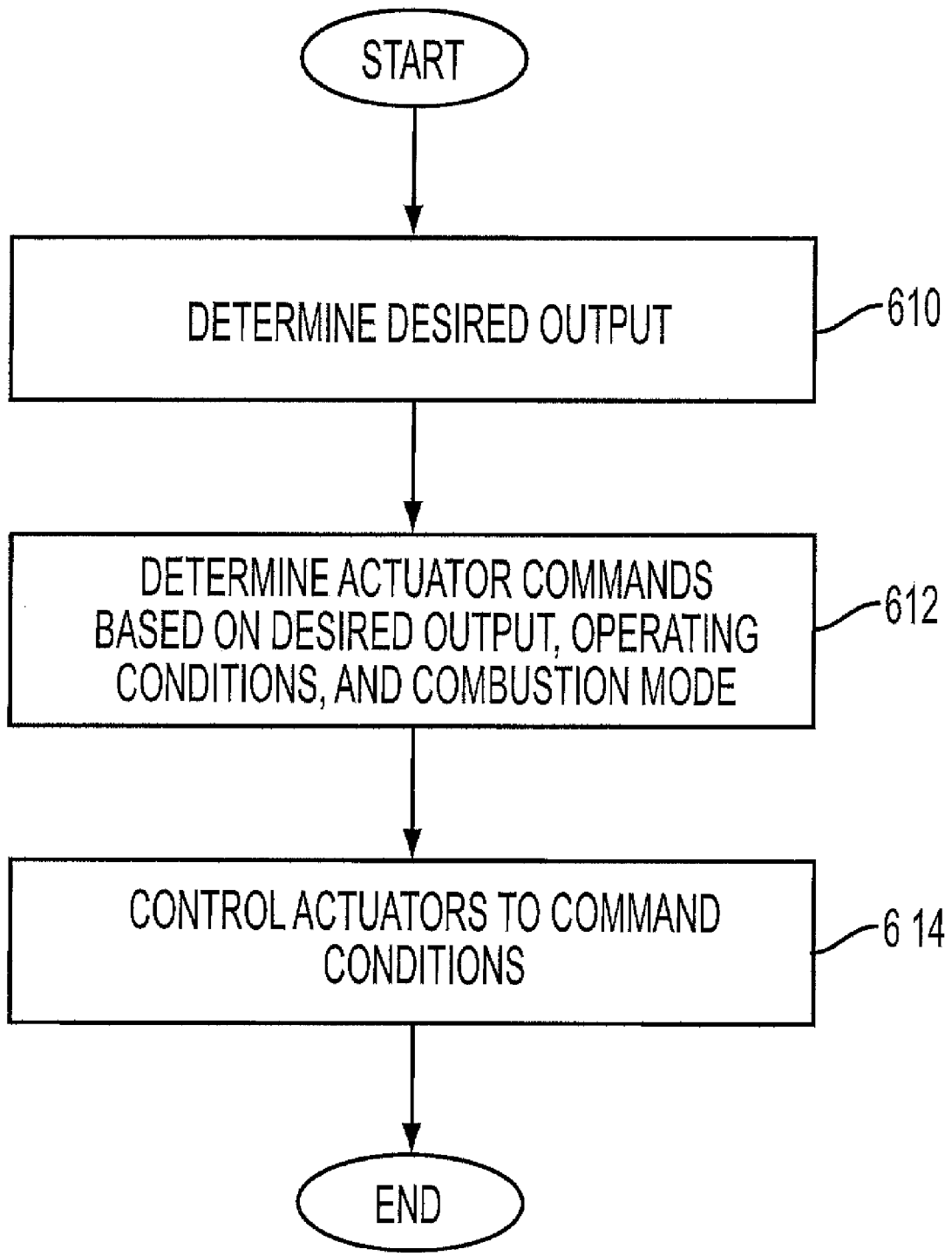

FIG. 6 illustrates a flow chart describing an example method for performing engine output control. At 610, the desired engine output may be determined. The desired engine output may be determined based on a condition of a driver input device such as an accelerator pedal, a brake pedal, a gear selection, and/or a particular control strategy performed by the control system. At 612, the actuator commands may be determined based on desired output, operating conditions, and the selected combustion mode. For example, the turbocharger or supercharger may be operated differently depending on the combustion mode selected for the engine. Further, the level of torque may be varied during SI mode operation by adjusting at least the amount of air supplied to the engine and may be varied during HCCI mode operation by adjusting at least the amount of fuel supplied to the engine. Next, the actuators may be controlled to commanded conditions at 614. Finally, the routine may end or return. In this way, the control system may coordinate various actuators of the engine system to achieve the desired output with respect to the combustion mode selected among other operating conditions.

Figure 7:
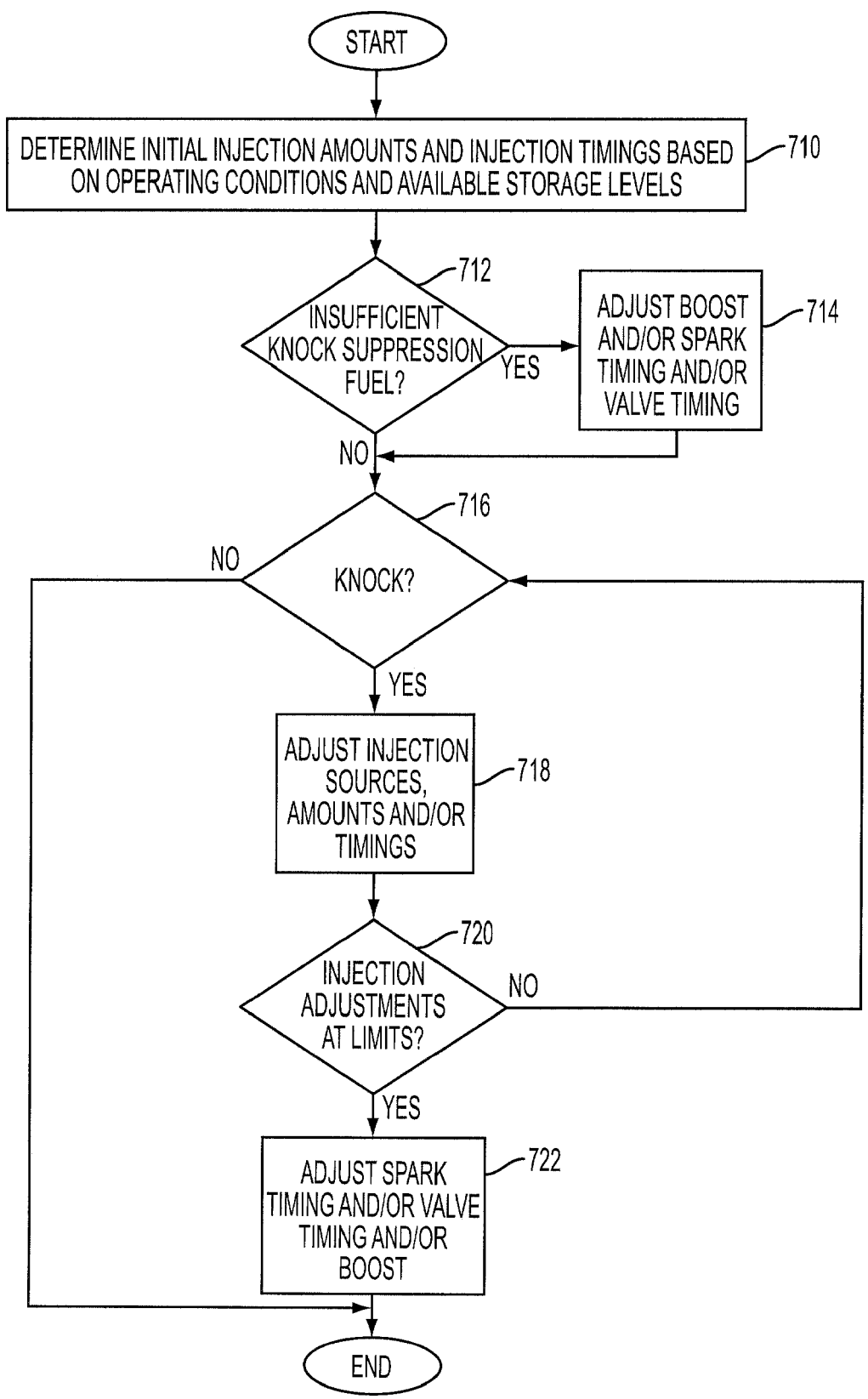

FIG. 7 illustrates a flow chart describing an example method for operating the engine in SI mode. At 710, the initial injection amounts and injection timings may be determined based on operating conditions and available fuel storage levels. Next, it may be judged at 712 whether there is insufficient knock suppression fuel or fluid (e.g. a fluid including ethanol or methanol, among others). If the answer at 712 is yes, the level of boost provided by the turbocharger or supercharger, the spark timing, and/or the valve timing may be adjusted at 714 to reduce the potential for knock. For example, the level of boost provided by a supercharger or turbocharger may be reduced and/or spark may be retarded to reduce knock. Next, at 716 it may be judged whether knock has occurred based on a knock sensor, peak cylinder pressure sensor or other suitable detection approach, for example. If the answer is no, the routine may end or return. Alternatively, if knock has been detected or if a knock condition is predicted by the control system, the sources of injection (e.g. the fuel injector), the amounts and/or ratios of the fuels or fluids (e.g. relative and/or absolute), and the timing of the injections may be adjusted at 718 to reduce knock. As one example approach, if knock is to be reduced, then the absolute and/or relative amount ethanol directly injected into the combustion chamber may be increased.

At 720, it may be judged whether the injection adjustments are at a threshold or limit of the adjustment range. For example, a fuel injector may have reached a lower or upper limit of the amount of fuel or fluid that may be injected per an injection event (e.g. the minimum pulse width). As another example, the amount of ethanol and/or gasoline provided to the combustion chamber may reach an upper or lower limit based on the configuration of the fueling system, the amount of fuel available, etc. If the answer at 720 is no, then the routine may return to 716 where it is again judged whether knock has been detected or a knock condition exists. For a given operating condition, in addition to varying the fuel injection, knock may be reduced by decreasing the level of boost, reducing the peak temperature and/or pressure of the cylinder by varying valve actuation, and/or by retarding the spark timing. Therefore, if the answer at 720 is yes, the spark timing, valve timing, and/or level of boost provided by the turbocharger or supercharger may be adjusted at 722 to reduce knock. Next, the routine may end or return. In this way, the control system may coordinate injection amounts and/or timings for a fuel and a knock suppressing fluid while controlling engine boosting, spark timing, and valve timing to achieve reduced engine knock and improved drivability.

Figure 8:
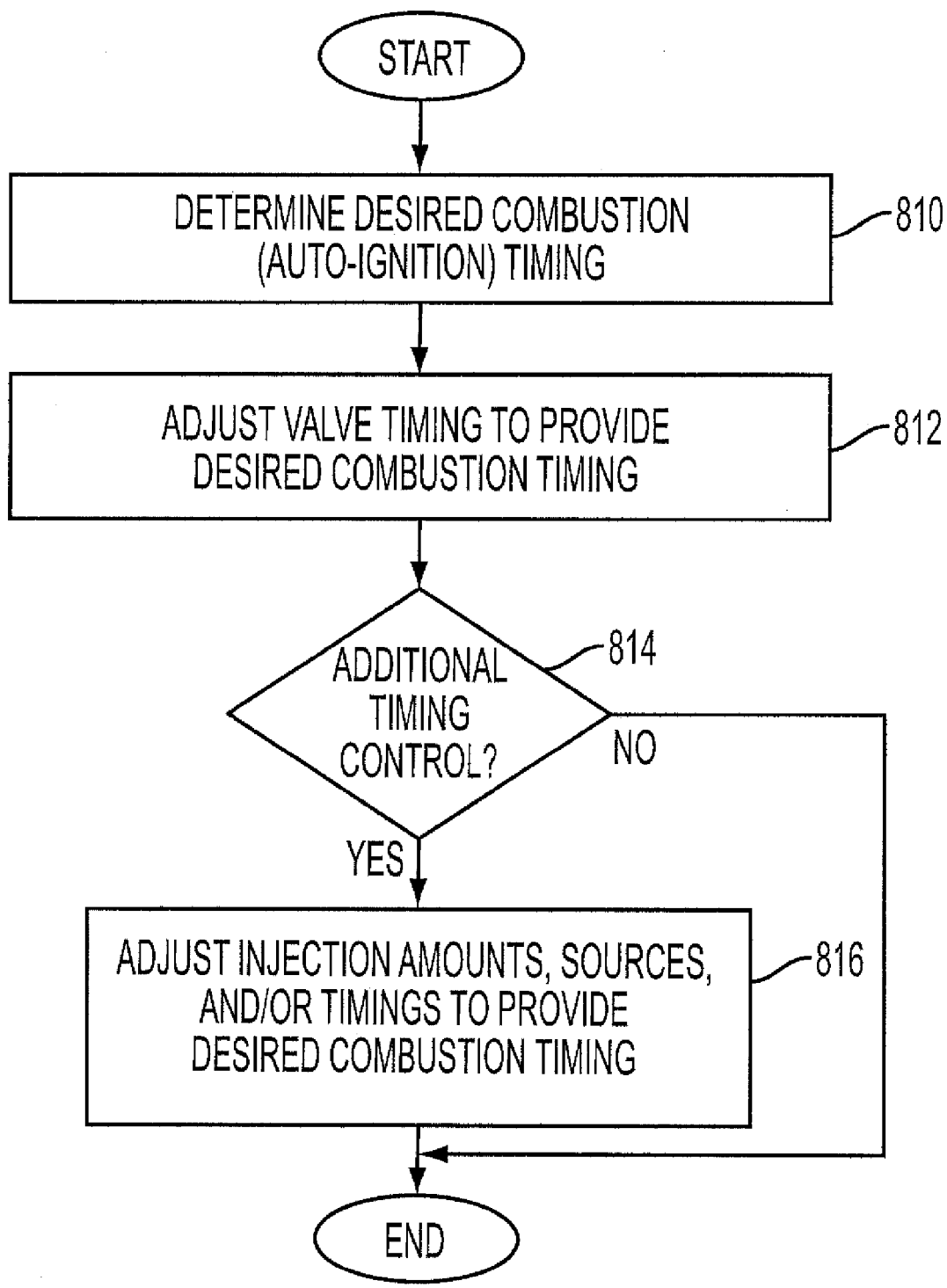

FIG. 8 illustrates a flow chart describing an example method for operating the engine in HCCI mode. At 810, the desired combustion timing (e.g. via auto-ignition) may be determined. At 812, the valve timing may be adjusted to provide the desired combustion timing. As one example, the timing of at least one exhaust valve may be adjusted to vary a level of exhaust gases retrained within the engine cylinders to vary the timing of auto-ignition. At 814, it may be judged whether there is additional combustion timing control available. For example, it may be judged if there is a sufficient level of E85, ethanol, or fuel of a differing octane rating to provide a suitable level of combustion timing control. If the answer is no, the routine may end. Alternatively, if the answer at 814 is yes, the injection amounts to one injector, or the amount to multiple injectors, source of fuel injected, and/or injection timings may be adjusted to provide the desired combustion timing. For example, ethanol may be injected through both a port and a direct injector, where the amount of ethanol through each injector is adjusted, with a substantially constant total amount of ethanol while varying the knock suppression over a wide range of operating conditions. Finally, the routine may end or return. In this way, the control system may coordinate the valve timing, selection of injector, injection amount and/or injection timing of a fuel and a knock suppressing fuel or fuel mixture to achieve the desired timing of combustion while reducing knock.

Figure 9:
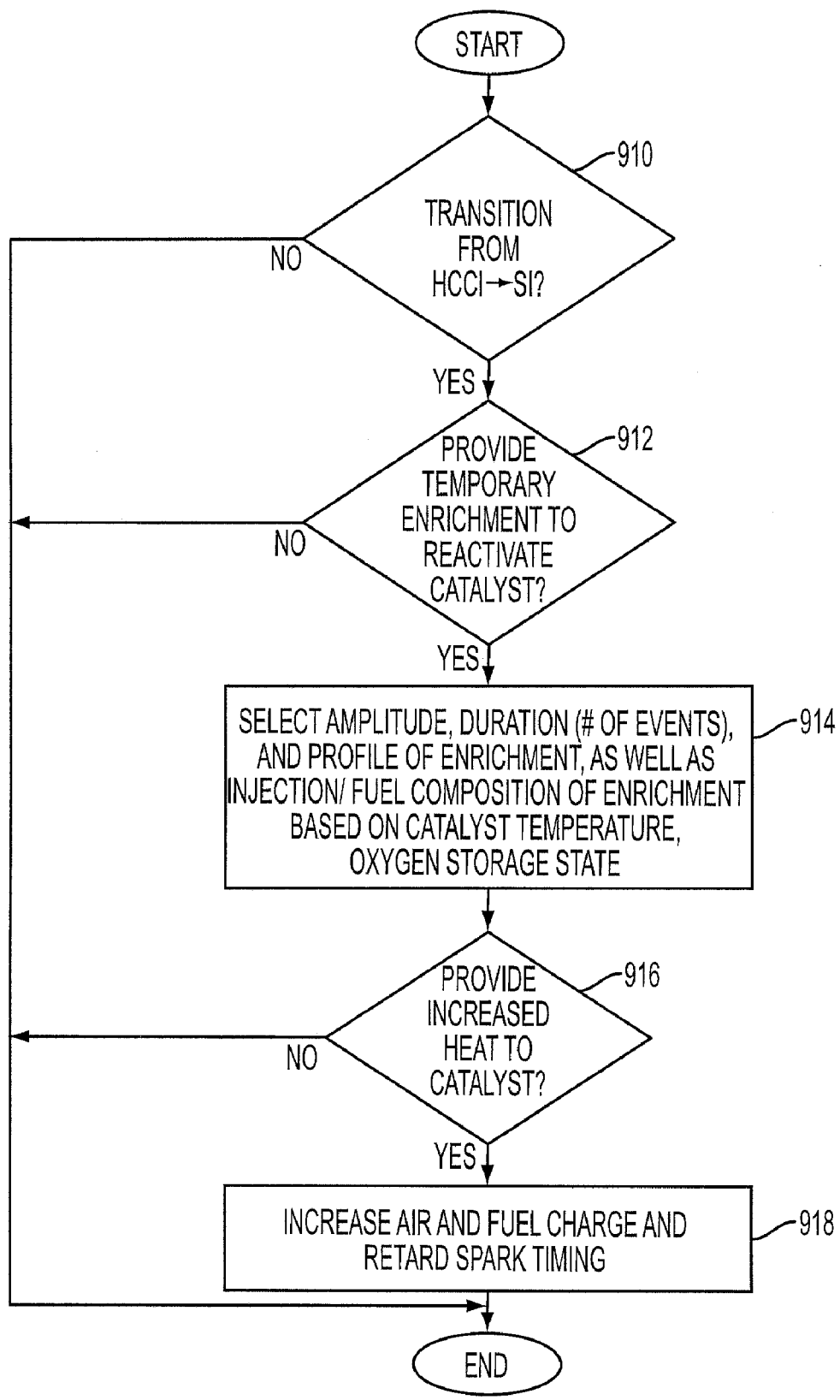

FIG. 9 illustrates a flow chart describing an example method for transitioning the engine between SI mode and HCCI mode. At 910, it may be judged whether a transition from HCCI mode to SI mode is requested. If the answer at 910 is no, the routine may end or return. Alternatively, if a transition from HCCI to SI is requested, it may be judged at 912 whether to provide temporary enrichment of the exhaust gases to facilitate reactivation of the catalyst in addition to the increase in the amount of gasoline and/or ethanol delivered to the combustion chamber for SI combustion. As one example approach, the ratio of gasoline and/or ethanol to air may be at least temporarily increased for one or more cycles depending on the level of enrichment desired as well as the catalyst conditions. If the answer at 912 is no, the routine may end or return. Alternatively, if the answer at 912 is yes, the amplitude, duration (e.g. number of events), and profile of enrichment may be selected as well as injection/fuel composition of enrichment based on catalyst temperature, oxygen storage state, engine torque, turbocharging, ambient conditions, or other operating conditions, etc.

As one example, the amplitude of enrichment can be related to the operator demand for torque and the duration can be related to the catalyst state including the amount of stored oxygen and/or temperature. In some conditions, the profile of the enrichment may include an enrichment that starts out small and increases in amplitude as the catalyst heats up, for example, shortly after start-up. In other conditions, such as when the catalyst is already at a prescribed operating temperature, the enrichment may start out higher and decrease with the number of engine fueling events. The number of engine events for enrichment may be correlated to and varied in response to the volume of catalyst that is to be reactivated, the amount of enrichment, the profile of the enrichment, and the duration of the enrichment, among other operating conditions.

At 916 it may be judged whether to provide increased heat to the catalyst. If the answer is no, the routine may end or return. Alternatively, if the answer at 916 is yes, the air and/or fuel charge may be increased and/or the spark timing may be retarded at 918 in proportion to the various conditions selected at 914 to increase catalyst heating. Finally, the routine may end or return. In this way, the control system may coordinate a transition from HCCI to SI by providing temporary enrichment of the charge while maintaining the desired engine torque and combustion timing, thereby enabling a reactivation of the catalyst after sustained operation in HCCI mode.

The transition between two very different modes of operation may be achieved by the increased flexibility of using multiple fuels and multiple injectors per cylinder. Thus, it may be possible during transition from HCCI mode (low load) to SI mode (high load) to operate with similar manifold pressures, and even to operate simultaneously some cylinders in SI mode with some cylinders in HCCI modes, for short periods of time. Under these circumstances, at high inlet manifold pressure and increased torque the conditions in the cylinders that are operating under SI mode would have large tendency to knock. Alcohol (ethanol) addition (e.g., directly injected ethanol), coupled with spark adjustment, can be used during this operation to prevent knock and to perform a smooth overall transition from HCCI lean mode to SI stoichiometric operation. Smooth transition from HCCI to SI mode of operation can be facilitated through varying during the transition the number of cylinders in SI mode and the balance in HCCI mode (it is assumed that at the start of transition all the cylinders are active, otherwise inactivated cylinders would be activated before transitioning to SI mode). In other words, the use of alcohol (e.g., ethanol) as an antiknock agent may allow operating in a combined mode with some cylinders HCCI and some SI, at the same manifold pressure (where variable spark retard can be used to adjust the torque in order to achieve smooth transitions, with a relatively slow response of the manifold pressure).

In addition, it may be possible to operate the engine during HCCI to SI transitions in a manner to minimize emissions during and following the transient, as described next. FIGS. 10A-10E illustrates a timing diagram of example transitions from HCCI mode to SI mode including a temporary enrichment of the overall air/fuel ratio to facilitate catalyst reactivation in addition to an increase in the fuel and/or fluid delivered to the engine for operation in SI mode. In particular, FIGS. 10A-10E show the ratio of air to fuel and/or fluid delivered to the engine along the vertical axis compared to time represented by the number of fueling events along the horizontal axis. While time is represented in these examples as the number of fueling events relative to the transition, it should be appreciated that these are merely examples and that the enrichment including the temporary enrichment of the charge for catalyst reactivation may be performed for a longer or shorter period of time or events, depending on various operating conditions.

In the examples of FIGS. 10A-10E, the last three fueling events in HCCI mode are shown leading up to the transition to SI mode. During the last three HCCI events, the ratio of air to gasoline and ethanol is lean of stoichiometry as may be used during HCCI operation to achieve improved fuel efficiency. For example, in FIGS. 10A-10E, ethanol is not included with the gasoline during the last three fueling events in HCCI mode, however, it should be appreciated that ethanol may be included with gasoline during HCCI operation in some conditions.

After the transition to SI mode, the level of gasoline and/or ethanol delivered to the engine are increased. This increase may include at least two components. For example, a first component may include an increase from the lean operation of HCCI mode to the near stoichiometric operation in SI mode while the second component may include a temporary increase or enrichment of the gasoline and ethanol delivered to the engine to facilitate catalyst reactivation and provide knock suppression. FIGS. 10A-10E illustrate some of the different ways that the first and second components may be varied responsive to the transition.

While reviewing the examples below, it should be noted that the level of knock suppression may be varied by adjusting the absolute amount of ethanol and/or relative amount of ethanol to gasoline directly injected into the engine (as well as by varying injection timing, for example) while the rate and/or level of catalyst reactivation may be varied by at least adjusting the relative amounts of ethanol and gasoline to air. For example, to increase knock suppression, the amount of ethanol, and in particular, the amount of ethanol that is directly injected into the cylinder, (absolute and/or relative) may be increased, and to increase the rate and/or level of reactivation of the catalyst, the ratio of fuel to air may be increased at least temporarily to provide additional products such as hydrocarbons and CO to the catalyst for reactivation from lean operation in HCCI mode.

Figure 10A:
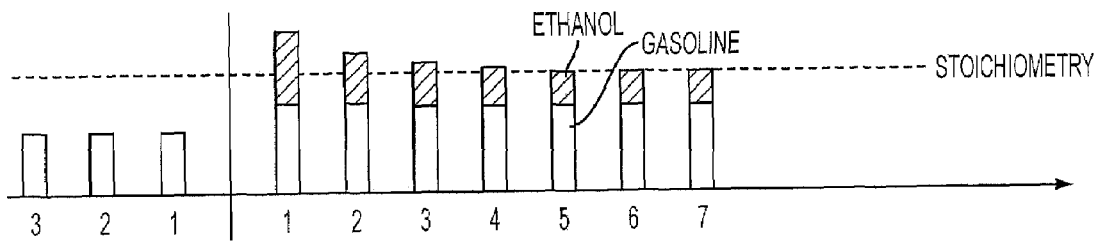
FIGS. 10A-10E and 11A-11B illustrate the air/fuel ratio of the cylinders before and after selected transients, as well as the gasoline/ethanol ratio.

FIG. 10A illustrates an example where the amount of gasoline delivered to the engine is increased to a substantially constant value after the transition to SI mode, while the level of ethanol is temporarily increased to an amount that is reduced over time until a substantially stoichiometric level of air to gasoline and ethanol is attained at event 5, the ethanol to gasoline ratio determined by the need to avoid knock.

Figure 10B:
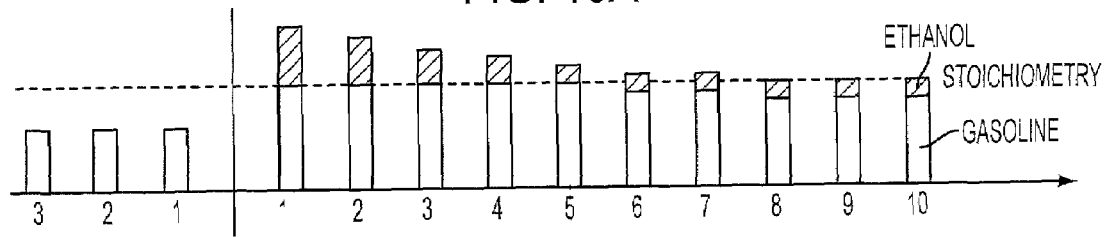

Alternatively, the level of ethanol and/or gasoline may be varied to achieve the desired level of knock suppression during the transition. For example, FIG. 10B illustrates how the amount of ethanol and gasoline to air may be temporarily increased to a level richer than stoichiometry to reactivate the catalyst while the relative amounts of ethanol to gasoline may be varied to provide knock suppression. For example, more knock suppression may be needed shortly after the transition than later in SI mode due to increased levels of EGR or intake air heating that may be used in HCCI mode. Further, FIG. 10B illustrates how the duration of enrichment may be increased or decreased in some conditions as compared to FIG. 10A based on operating conditions, such as the condition of the catalyst (e.g. temperature, amount of oxygen stored, size, etc.), duration of operation in HCCI mode, air/fuel ratio before the transition, among other conditions.

Figure 10C:
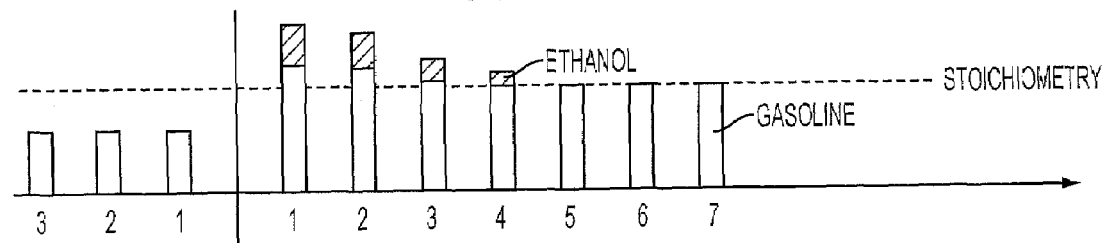

FIG. 10C illustrates another example of a transition from HCCI to SI mode where the level of gasoline may be temporarily increased above a stoichiometric amount while the absolute amount and relative amount of ethanol to gasoline provided to the engine are reduced over time after the transition. In contrast to the profile of gasoline enrichment shown in FIGS. 10A (i.e. substantially constant) and 10B (i.e. variable at or below stoichiometry), the level of gasoline provided to the engine may be varied above stoichiometry for at least a duration. Further, FIG. 10C illustrates how the use of ethanol may be discontinued after a temporary period of enrichment as shown at events 5-7. For example, knock suppression and enrichment may not be necessary after event 4, thereby enabling a substantially stoichiometric amount of gasoline to be supplied to the engine.

Figure 10D:
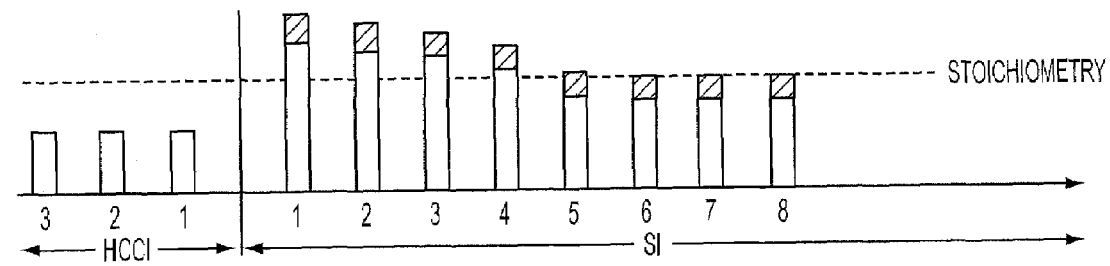

FIG. 10D illustrates how the absolute amount of ethanol may be held substantially constant while the absolute amount of gasoline delivered to the engine is temporarily increased and then decreased over time, in contrast to FIG. 10A, where the absolute amount of gasoline may be held substantially constant. Further, it should be appreciated that the ratio of ethanol to gasoline may be held substantially constant during the enrichment period or may be varied to achieve the desired level of knock suppression.

Figure 10E:
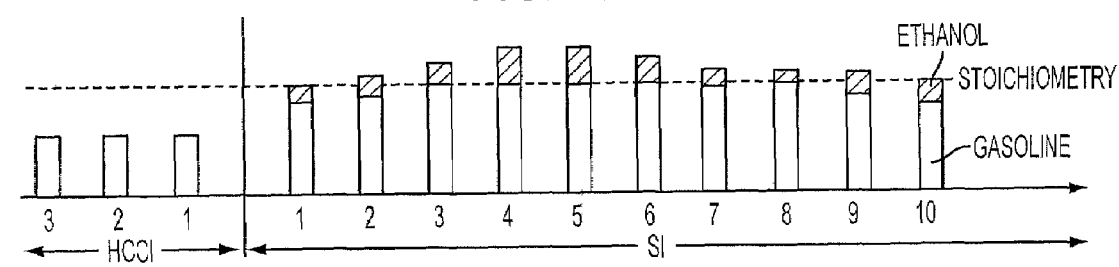

FIG. 10E illustrates an example where the enrichment profile may be increased with time after the transition before it is reduced to stoichiometry. For example, during events 1-4, the total amount of gasoline and ethanol to air may be increased to a level greater than stoichiometry and subsequently reduced over a period of time as indicated by events 5-9. This operation may be used, for example, during a catalyst warm-up period.

In this manner, different enrichment profiles may be used in response to a transition or transient condition in conjunction with varying ratios of ethanol to gasoline to achieve knock suppression.

It should be noted that while FIGS. 10A-10E describe an overall air/fuel ratio, it is possible to have cylinders-to-cylinder variation, as would be the case when some cylinders operate in HCCI mode and some on SI mode simultaneously. In the case when the engine operates on both SI and HCCI mode simultaneously, the additional fuel can be introduced in the SI or HCCI cylinders, for the cylinders under HCCI operation with late injection of the fuel.

Figure 11A:
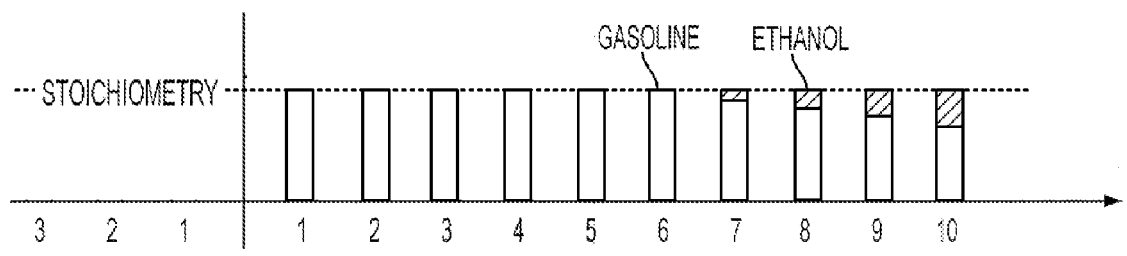
Figure 11B:
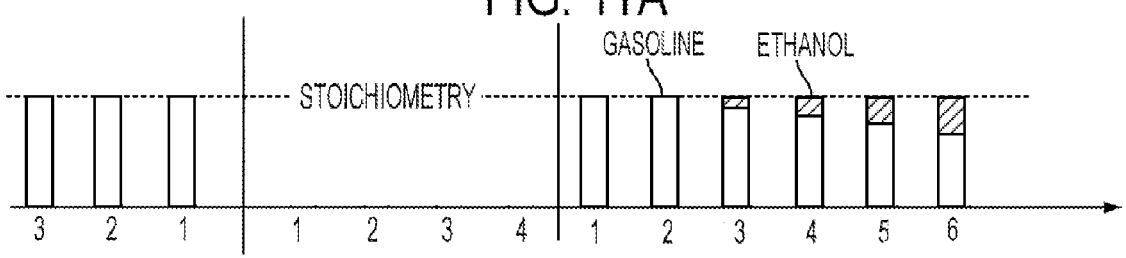

Referring now to FIGS. 11A and 11B, example graphs illustrate injection of fuel during a start-up of the engine or at least one cylinder thereof. For example, FIG. 11A illustrates a fueling operation for a cylinder of the engine where the engine is initially shut-off and is later started (e.g. from a cold start) in SI mode. After start-up of the engine, ethanol may not be used until the engine and/or catalyst reach a warmed-up condition, as indicated for cycles 1-6. As the engine and/or catalyst reach a suitable temperature, the relative and/or absolute amount of directly injected ethanol may be increased over one or more cycles to provide the desired knock suppression and/or air fuel ratio.

As another example as shown in FIG. 11B, the engine or one or more cylinders of the engine may be temporarily shut-off to increase fuel efficiency, such as during an engine idle operation or other condition where engine torque is not desired. For example, after an engine or cylinder shut-down, at least a cylinder of the engine may be later restarted in SI mode. FIG. 11B illustrates a temporary shut-off operation of at least one cylinder of the engine followed by a restart of the cylinder. The cylinder of the engine may be initially operating in SI or HCCI mode prior to shut-off as indicated by a countdown of the last three cylinder cycles. Next, the cylinder and/or engine may be temporarily shut-off (e.g. at least fueling is stopped) as indicated by cycles 1-4. At a later time, the cylinder and/or engine may be restarted where the use of ethanol is discontinued in favor of gasoline for a period represented by cycles 1-2 before ethanol is added as the engine and/or catalyst reaches a suitable temperature. For example, FIG. 11B shows only gasoline injected into the cylinder for the first two cycles after restart, while the amount of ethanol added during cycles 3-6 is increased as engine or catalyst temperature further increases.

A comparison of FIGS. 11A and 11B illustrates how the relative amounts of ethanol to gasoline can be adjusted differently based on the temperature of the engine and/or catalyst. For example, a cylinder restart operation, as shown in FIG. 11B, may utilize the addition of ethanol earlier than the cold start example of FIG. 11A, due to residual heat of the engine or catalyst that may be stored from the prior engine operation. It should be appreciated that the duration of events shown in FIGS. 10-11 are provided for illustrative purposes and that other durations are possible. As one example, heating of the engine and/or catalyst may include 10, 100, or 1000 or more cycles of the cylinder or engine before ethanol is injected in addition to the gasoline. In this way, ethanol may be conserved during a warm-up condition of the engine and/or catalyst and may be used to reduce knock during higher temperature conditions. Note that while the various control routines set forth above with reference to FIGS. 4-10 have been described with regards to the engine as a whole, it should be appreciated that the control routines or portions thereof may be applied on an individual cylinder or group of cylinders basis. For example, during split cylinder operation where at least one cylinder of the engine is operating in SI mode and at least one cylinder is operating in HCCI mode, the above described control strategies may be applied on a cylinder by cylinder basis based on the particular operating conditions of the cylinder. For example, a level of torque produced by a first cylinder that is operating in SI mode may be varied by adjusting the amount of air provided to the first cylinder (e.g. via valve timing, throttle position, and/or turbocharging or supercharging) or changes in spark timing, while a level of torque produced by a second cylinder that is concurrently operating in HCCI mode may be varied by adjusting the amount and/or type of fuel and/or fluid provided to the second cylinder among other operating conditions. In still other examples, one or more cylinders of the engine may be selectively deactivated, wherein combustion is discontinued in the cylinder for one or more cycles. Still further, where the engine includes separate banks of cylinders communicating with separate exhaust manifolds having separate catalysts, the control strategies described above may be applied differently to each bank based on the combustion mode of the particular bank among other operating conditions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an engine, comprising:
performing homogeneous charge compression ignition combustion during a first operating condition; and
performing spark ignition combustion during a second operating condition; and
transitioning between said homogeneous charge compression ignition and said spark ignition combustion, where an amount of alcohol in at least one of said homogeneous charge compression ignition combustion and in said spark ignition combustion is varied in response to the transition, where variation of the amount of alcohol during the transition is further based on an operating parameter of the transition.

2. The method of claim 1 where the alcohol is directly injected.

3. The method of claim 2, wherein the engine is fueled by gasoline and by directly injected alcohol, and where during the transition, said amount of alcohol in said homogeneous charge compression ignition combustion is temporarily increased and an air-fuel ratio during the transition is also temporarily enriched.

4. The method of claim 3 wherein the alcohol is further port fuel injected, where a ratio of directly injected to port fuel injected alcohol is varied so as to vary knock suppression.

5. The method of claim 1, wherein said operating parameter includes at least one of temperature, turbo charging, and engine torque, and where during the transition between homogeneous charge compression ignition combustion and spark ignition combustion, the engine temporarily concurrently operates with some cylinders carrying out spark ignition combustion and some cylinders carrying out homogeneous charge compression ignition combustion.

6. The method of claim 1, wherein said operating parameter includes knock, and where said first operating condition includes at least one of a lower engine speed and lower engine load than said second operating condition.

7. The method of claim 1, wherein said amount of alcohol is varied by varying a relative amount of alcohol to gasoline that is injected into the engine, where during spark ignition combustion, said amount of alcohol is adjusted to reduce tendency of knock, and where during homogenous charge compression ignition combustion, said amount of alcohol is adjusted to vary timing of compression ignition.

8. The method of claim 7, wherein said alcohol and said gasoline are injected directly into at least one cylinder of the engine via a direct injector, and where said amount of alcohol during spark ignition combustion is adjusted in response to engine knock.

9. The method of claim 7, wherein said alcohol is injected into the engine via a first injector and said gasoline is injected into the engine via a second injector.

10. The method of claim 7, wherein said relative amount of alcohol to gasoline is increased as temperature of the engine increases.

11. The method of claim 7, wherein said relative amount of alcohol to gasoline is increased as a level of knock increases.

12. The method of claim 1, further comprising, adjusting a timing of said homogeneous charge compression ignition combustion by varying an amount of alcohol delivered to the engine and a delivery timing of alcohol to the engine.

13. The method of claim 12, wherein said amount of alcohol is at least one of an absolute amount of alcohol delivered to the engine and a relative amount of alcohol to gasoline that is delivered to the engine.

14. The method of claim 1, wherein said alcohol includes ethanol and where a compression ratio of the engine is greater than 13:1.

15. An engine system, comprising:
at least one combustion chamber;
a fuel system for delivering a first fuel including gasoline and a second fuel including alcohol to the combustion chamber;
a control system to transition the combustion chamber from an auto-ignition combustion mode to a spark ignition combustion mode, where in response to the transition, the control system provides a rich air-fuel ratio with at least some of said second fuel delivered to the combustion chambers;
at least an exhaust valve for controlling a level of exhaust gas retained by the combustion chamber, wherein said control system is further configured to vary the amount of the second fuel including alcohol in response to a timing of said exhaust valve; and
a catalyst arranged in an exhaust stream of the combustion chamber, wherein the control system is further configured to vary the amount of the first fuel including alcohol to the combustion chamber in response to a condition of the catalyst, wherein the condition of the catalyst includes at least one of a temperature of the catalyst and level of oxygen stored by the catalyst.

16. The engine system of claim 15, where in response to the transition from the auto-ignition combustion mode to the spark ignition combustion mode, the control system is further configured to increase the ratio of the second fuel including alcohol to the first fuel including gasoline and wherein said alcohol includes ethanol and said auto-ignition combustion mode includes combustion by homogeneous charge compression ignition, the control system further configured to increase the amount of the second fuel including alcohol in response to a level of knock, where said combustion chamber has a compression ratio of at least 13:1.

17. The engine system of claim 15 further comprising, a spark plug for initiating combustion at least during said spark ignition combustion mode and where the control system is further configured to vary the spark timing to adjust an amount of torque produced by the engine in response to said transition.

18. The system of claim 15, where the control system further varies an amount of the second fuel in response to a number of combustion events from the transition.

19. A method of operating an engine, comprising:
performing homogeneous charge compression ignition combustion during a first operating condition;
performing spark ignition combustion during a second operating condition; and
transitioning from said homogeneous charge compression ignition to said spark ignition combustion, where a knock suppression is increased at least during a first spark ignition combustion during the transition compared to that of a previous homogenous charge compression ignition combustion; and
varying an amplitude and duration of enrichment during the transition in response to operating parameters.

20. The method of claim 19, further comprising varying a number of engine events of enrichment after the first spark ignition combustion, the number varied in response to catalyst volume to be reactivated, amount of enrichment, and duration of enrichment.

* * * * *